(12) United States Patent
Golini et al.

(10) Patent No.: US 12,344,700 B2
(45) Date of Patent: Jul. 1, 2025

(54) STORAGE STABLE HFO- OR HCFO-CONTAINING POLYOL COMPOSITIONS FOR MAKING FLAME-RESISTANT RIGID POLYURETHANE FOAMS

(71) Applicant: Dow Global Technologies LLC, Midland, MI (US)

(72) Inventors: Paolo Golini, Correggio (IT); Berrin Degirmenci, Correggio (IT)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 712 days.

(21) Appl. No.: 17/608,681

(22) PCT Filed: Apr. 27, 2020

(86) PCT No.: PCT/US2020/030080
§ 371 (c)(1),
(2) Date: Nov. 3, 2021

(87) PCT Pub. No.: WO2020/242692
PCT Pub. Date: Dec. 3, 2020

(65) Prior Publication Data
US 2022/0213250 A1  Jul. 7, 2022

(30) Foreign Application Priority Data

May 24, 2019  (IT) .......... 102019000007231

(51) Int. Cl.
*C08G 18/20* (2006.01)
*C08J 9/14* (2006.01)

(52) U.S. Cl.
CPC .......... *C08G 18/2027* (2013.01); *C08J 9/144* (2013.01)

(58) Field of Classification Search
CPC .............. C08G 18/161; C08G 18/1816; C08G 18/1825; C08G 18/1858; C08G 18/2027; C08G 18/2081; C08G 18/4018; C08G 18/4219; C08G 18/4607; C08G 18/4829; C08G 18/7664; C08J 9/0038; C08J 9/144; C08J 9/146; C08J 2203/162; C08J 2375/04

See application file for complete search history.

(56) References Cited

U.S. PATENT DOCUMENTS

| | | |
|---|---|---|
| 2013/0190415 A1 | 7/2013 | Burdeniuc |
| 2014/0113984 A1* | 4/2014 | Burdeniuc ............... C08J 9/02 521/131 |
| 2015/0175735 A1 | 6/2015 | Burdeniuc |
| 2015/0266994 A1 | 9/2015 | Burdeniuc |
| 2015/0344660 A1 | 12/2015 | Williams |
| 2016/0075817 A1 | 3/2016 | Burdeniuc |
| 2016/0145374 A1 | 5/2016 | Ishikawa |
| 2017/0081491 A1 | 3/2017 | Chen |
| 2017/0101501 A1 | 4/2017 | Forkner |

FOREIGN PATENT DOCUMENTS

| | | |
|---|---|---|
| EP | 1883664 A | 2/2008 |
| EP | 2412753 A | 2/2012 |
| WO | 2006/124364 A | 11/2006 |
| WO | 2018/227358 A | 12/2018 |

* cited by examiner

*Primary Examiner* — John M Cooney
(74) *Attorney, Agent, or Firm* — Warner Norcross + Judd LLP

(57) ABSTRACT

Formulated polyol compositions include a non-halogenated polyol, a halogenated polyol, a phosphorus-containing flame retardant, an HFO and/or HCFO blowing agent and certain urethane catalysts. The compositions exhibit excellent storage stability. Foams made from the formulated polyol compositions have unexpectedly improved fire performance, as indicated by certain fire tests.

4 Claims, No Drawings

STORAGE STABLE HFO- OR HCFO-CONTAINING POLYOL COMPOSITIONS FOR MAKING FLAME-RESISTANT RIGID POLYURETHANE FOAMS

This invention relates to a storage stable polyol composition containing an HFO or HCFO, which is useful for making flame-resistant rigid polyurethane foams, and to methods of making flame-resistant rigid foams using an HFO or HCFO.

Rigid polyurethane or polyurethane-polyisocyanurate foams are often used as thermal insulation materials in construction and transportation applications, among others. They are commonly made by reacting one or more polyols with one or polyisocyanates in the presence of a physical blowing agent, a foam-stabilizing surfactant and one or more urethane catalysts.

HFOs (hydrofluoroolefins) and HCFOs (hydrochlorofluoroolefins) represent a class of low-boiling fluorochemicals. HFOs and HCFOs have zero or close to zero ozone depletion potentials and in many cases have very low global warming potentials. These properties make them attractive from an environmental standpoint.

It is often convenient to combine the polyols with the physical blowing agent and catalysts (and often the surfactant and other ingredients) to produce a formulated polyol composition that can be stored until such time as the foam is to be manufactured. At that time, the formulated polyol composition is mixed with the polyisocyanate and any remaining ingredients to form a reaction mixture that expands and cures to produce the foam. An advantage of formulating the polyol with other ingredients beforehand is that it simplifies storage and metering, reducing costs and making a more consistent foam product.

Formulated polyol compositions containing HFOs and HCFOs tend to exhibit poor storage stability. Compositions containing these blowing agents often become less reactive when stored for prolonged periods of time. In some instances, particular catalysts have been suggested as improving storage stability. US 2015-0266994 describes a mixture of a tetraalkylguanidine and an isocyanate-reactive tertiary amine catalyst. US 2017-0081491 describes a wide range of amine catalysts in conjunction with polyols having a pH of 4-10.

Flame resistance is a very important property for foams used in construction and transportation applications. What is desired is a formulated polyol composition that contains an HFO or HCFO blowing agent, yet exhibits good storage stability, and forms foams that have good flame retardant properties.

The invention is in one aspect a formulated polyol composition comprising:
a) at least one non-halogenated polyol having a hydroxyl functionality of 2 to 8 and a hydroxyl number of 200 to 560;
b) at least one brominated polyol;
c) at least phosphorus-containing flame retardant;
d) a physical blowing agent that includes at least one HFO and/or HCFO blowing agent;
e) at least one foam-stabilizing surfactant and
f) a urethane catalyst selected from one or more of
  i) a dialkylimidazole compound
  ii) 2,2'-dimorpholinodiethylether
  iii) a tetraalkyl guanidine compound
  iv) 2,2,2-dimethylaminoethoxyethyl methylaminoethanol and
  v) N,N-dimethylcyclohexylamine.

The formulated polyol composition exhibits excellent storage stability.

In another aspect, the invention is a method of making a rigid polyurethane foam, comprising
I. forming a reaction mixture comprising
  a) at least one non-halogenated polyol having a hydroxyl functionality of 2 to 8 and a hydroxyl number of 200 to 560;
  b) at least one brominated polyol;
  c) at least phosphorus-containing flame retardant;
  d) a physical blowing agent that includes at least one HFO and/or HCFO blowing agent;
  e) at least one foam-stabilizing surfactant and
  f) a urethane catalyst selected from one or more of
    i) a dialkylimidazole compound
    ii) 2,2'-dimorpholinodiethylether
    iii) a tetraalkyl guanidine compound
    iv) 2,2,2-dimethylaminoethoxyethyl methylaminoethanol and
    v) N,N-dimethylcyclohexylamine; and
  g) at least one aromatic polyisocyanate, and
II. curing the reaction mixture under conditions that the physical blowing agent volatilizes and components a), b) and g) react to form the rigid polyurethane foam.

Very surprisingly, the foam performs particularly well on certain fire performance tests, and in particular compliance with the B2 class defined by the DIN 4102 test, compared to an otherwise like foam made using different amine catalysts.

Component a) is at least one non-halogenated polyol having a hydroxyl functionality of 2 to 8 and a hydroxyl number of 200 to 560. This non-halogenated polyol may be, for example, a polyether polyol or a polyester polyol.

Useful polyether polyols include ethoxylates and/or propoxylates of one or more hydroxyl- and/or amine group containing starters that have an equivalent weight of 30 to 59, including, for example, one or more of ethylene glycol, diethylene glycol, triethylene glycol, 1,2-propane diol, 1,3-propanediol, dipropylene glycol, tripropylene glycol, glycerin, trimethylolpropane, trimethylolethane, neopentyl glycol, 1,6-hexanediol, 1,4-cyclohexanedimethanol, 1,2,6-hexanetriol, monoethanolamine, diethanolamine, triethanolamine, pentaerythritol, erythritol, sorbitol, sucrose, mannitol, N,N,N',N'-tetrakis(2-hydroxypropyl)-ethylenediamine, diethyl toluenediamine, dimethylthiotoluenediamine and combinations thereof.

Useful polyester polyols may be reaction products of, for example, an organic dicarboxylic acid (or corresponding acid anhydride or ester) having about 2 to about 12 carbon atoms, preferably an aromatic dicarboxylic acid having 8 to 12 carbon atoms, with a polyhydric alcohol, preferably a diol and/or triol having 2 to 12 carbon atoms, preferably from 2 to 6 carbon atoms. Examples of suitable dicarboxylic acids are succinic acid, glutaric acid, adipic acid, suberic acid, azelaic acid, sebacic acid, decanedicarboxylic acid, maleic acid, fumaric acid, and preferably orthophthalic acid, isophthalic acid, terephthalic acid and the isomeric naphthalene-dicarboxylic acids. The dicarboxylic acids may be used either individually or mixed with one another. Examples of dihydric and polyhydric alcohols used to make the polyester polyol are ethanediol, diethylene glycol, 1,2- and 1,3-propanediol, dipropylene glycol, 1,4-butanediol, 1,5-pentanediol, 1,6-hexanediol, 1,10-decanediol, glycerol, trimethylolpropane. Also useful are modified aromatic polyester polyols such as described in U.S. Pat. No. 6,359,022, which contain one or more pendant aliphatic hydrocarbyl groups that have 6 or more carbon atoms in a straight or branched chain.

Furthermore, polyester polyols made from lactones such as ε-caprolactone or hydroxycarboxylic acids such co-hydroxycaproic acid and hydrobenzoic acid may also be employed. Hybrid polyether-polyester polyols such as are described, for example, in WO 2011/137011 are also useful.

The component a) polyol or polyols may constitute, for example, at least 10% and up to 90% of the total weight of components a)-f) and h) (as described below). A preferred amount is at least 25%, at least 40%, at least 50% or at least 55% and up to 75%, up to 70% or up to 65%, on the same basis.

Component b) is one or more brominated polyols. A brominated polyol is a compound having at least one bromine atom and at least two hydroxyl groups. Such a brominated polyol preferably has a hydroxyl number of at least 50, at least 100 or at least 150 and up to 400, up to 300 or up to 250. The brominated polyol may contain 2 to 8, preferably 2 to 4 or 2 to 3 hydroxyl groups per molecule and 1 to 8, preferably 1 to 4 bromine atoms per molecule. The bromine atoms may be bonded to aromatic and/or aliphatic carbon atoms. In some embodiments the brominated polyol is an aromatic polyester polyol. Such a brominated aromatic polyester polyol may be, for example, a polyester formed in a reaction of a brominated (with 1 to 4 bromine atoms) orthophthalic acid or brominated terephthalic acid (or corresponding anhydride or ester) with a low molecular weight polyol as described above with respect to polyester polyols within component a).

Component b) may constitute, for example, at least 1% and up to 80% of the total weight of components a)-f) and h). A preferred amount is at least 2%, at least 4%, at least 5% or at least 7.5% and up to 30%, up to 20% or up to 15%, on the same basis.

Component c) is one or more phosphorus-containing flame retardants. Examples of phosphorus-containing flame retardants include but are not limited to 1) optionally halogenated phosphates such as triphenyl phosphate, tributylphosphate, triethylphosphate, trimethylphosphate, tripropylphosphate, trioctylphosphate, diphenyl methylphosphate, tris-(2-ethylhexyl)phosphate, isodecyl diphenylphosphate, isooctyl diphenylphosphate, bisphenyl diphenylphosphate, resorcinol di-cresyl phosphate, trixylylphosphate or triisopropylphenylphenylphosphate; and halogenated phosphates such as tris(2-chloroethyl phosphate) (TCEP), tris(1-chloropropyl) phosphate (trichloropropyl phosphate), tris(2-chloroisopropyl phosphate) (TCPP), tris(3-chloropropyl) phosphate), tris(2-dichloroisopropyl phosphate) (TDCP), tris(1,3-dichloro-2-propyl)phosphate, tris(2,3-dichloropropyl) phosphate, tris(2,3-dibromopropyl)phosphate, tris(tribromoneopentyl)phosphate 2) phosphonates such as diethyl ethyl phosphonate (DEEP), as well as halogenated phosphonates; 3) optionally halogenated phosphinates; 4) optionally halogenated phosphine oxides; 5) optionally halogenated phosphines; 6) optionally halogenated polyphosphoric acid ammonium salts and 7) optionally halogenated phosphonium salts of the formula $R_4PX$, wherein each R is independently selected from substituted or unsubstituted, saturated or unsaturated, branched or straight-chain aliphatic moieties or substituted or unsubstituted aromatic moieties and X is a suitable counter ion.

Component c) may constitute, for example, at least 1% and up to 40% of the total weight of components a)-f) and h). A preferred amount is at least at least 5%, at least 7.5% or at least 10% and up to 30% up to 25% or up to 20%, on the same basis.

Useful HFO and/or HFCO hydrohaloolefin blowing agents (component d)) include those described, for example, in US 2007/0100010. Specific examples are trifluoropropene, 1,3,3,3-tetrafluoropropene (1234ze), 1,1,3,3-tetrafluoropropene, 2,2,3,3-tetrafluoropropene (1234yf), 1,2,3,3,3-pentafluoropropene (1225ye), 1,1,1-trifluoropropene, 1,1,1,3,3-pentafluoropropene (1225zc), 1,1,2,3,3-pentafluoropropene (1225yc), (Z)-1,1,1,2,3-pentafluoropropene (1225yez), 1-chloro-3,3,3-trifluoropropene (1233zd) and 1,1,1,4,4,4-hexafluorobut-2-ene (1336mzzm).

Component d) may constitute, for example, at least 1% and up to 30% of the total weight of components a)-f) and h). A preferred amount is at least at least 5%, and up to 20% up to 15% or up to 10%, on the same basis.

Component e) is one or more foam-stabilizing surfactants. Suitable surfactants include, but are not limited to, silicones such as silicone oils and organosilicone-polyether copolymers, including polydimethyl siloxane and polydimethylsiloxane-polyoxyalkylene block copolymers. Other suitable surfactants include organic surfactants such as nonylphenol ethoxylates and ethylene oxide/butylene oxide block co-polymers.

Component e) may constitute, for example, at least 0.25% and up to 10% of the total weight of components a)-f) and h). A preferred amount is at least at least 0.5% or at least 1%, and up to 5% or up to 3%, on the same basis.

Component f) is urethane catalyst selected from one or more of i) a dialkylimidazole compound, ii) 2,2'-dimorpholinodiethylether, iii) a tetraalkyl guanidine compound, iv) 2,2,2-dimethylaminoethoxyethyl methylaminoethanol and v) N, N-dimethylcyclohexylamine.

In some embodiments, component f) includes at least one dialkylimidazole compound. The alkyl groups preferably are independently $C_{1-6}$ linear, branched and/or cyclic, with $C_{1-4}$ alkyl groups being more preferred and methyl groups being especially preferred. The dialkylimidazole catalyst may constitute, for example, at least 0.05% or at least 0.1% and up to 0.75%, up to 0.5% or up to 0.3% of the total weight of components a)-f) and h).

2,2'-dimorpholinodiethylether, when present, may constitute, for example, at least 0.05% or at least 0.1% and up to 0.5%, up to 0.4% of the total weight of components a)-f) and h).

The alkyl groups of the tetraalkyl guanidine compound are independently $C_{1-6}$ linear, branched and/or cyclic, with $C_{1-4}$ alkyl groups being preferred and methyl groups being especially preferred. When present, the tetralkyl guanidine catalyst may constitute, for example, at least 0.01% or at least 0.025% and up to 0.5% or up to 0.25% of the total weight of components a)-f) and h).

When present, 2,2,2-dimethylaminoethoxyethyl methylaminoethanol may constitute, for example, at least 0.01% or at least 0.025% and up to 0.5% or up to 0.25% of the total weight of components a)-f) and h).

When present, N,N-dimethylcyclohexylamine may constitute, for example, at least 0.025% or at least 0.05% and up to 0.5% or up to 0.25% of the total weight of components a)-f) and h).

Component f) preferably includes the dialkylimidazole catalyst and further includes at least one of 2,2'-dimorpholinodiethylether, a tetraalkyl guanidine compound, 2,2,2-dimethylaminoethoxyethyl methylaminoethanol and N,N-dimethylcyclohexylamine.

In a particular embodiment, component f) includes the dialkylimidazole, 2,2-dimorpholinodiethylether and optionally N,N-dimethylcyclohexylamine. The dialkylimidazole is preferably dimethylimidazole in this particular embodiment. In such embodiments, the dialkylimidazole may constitute 0.1 to 0.5%, 2,2-dimorpholinodiethylether may constitute 0.25 to 0.4% and N,N-dimethylcyclohexylamine, if present, may constitute 0.05 to 0.25% of the total weight of components a)-f) and h).

In other particular embodiments, component f) is a mixture of a dialkylimidazole compound (preferably a dimethylimidazole), a tetraalkyl guanidine compound (preferably a tetramethyl guanidine) and optionally 2,2,2-dimethylaminoethoxyethyl methylaminoethanol. In such embodiments, the dialkylimidazole may constitute 0.1 to 0.5%, the tetraalkyl guanidine compound and 2,2,2-dimethylaminoethoxyethyl methylaminoethanol (if present) each may constitute 0.025 to 0.25% of the total weight of components a)-f) and h).

The formulated polyol composition and reaction mixture preferably exclude any other amine catalysts other than those mentioned above, and may further exclude any metal-containing urethane catalysts.

A formulated polyol composition and a reaction mixture of the invention may further contain various optional ingredients. Among the optional ingredients is component h), a non-halogenated isocyanate-reactive material different from components a)-f). Such an isocyanate-reactive material may include, for example, i) water, ii) a polyol having a hydroxyl number greater than 550 or less than 200 and/or iii) one or more compounds having one or more primary and/or secondary amino groups. Examples of ii) include low equivalent weight polyols such as ethylene glycol, diethylene glycol, triethylene glycol, 1,2-propane diol, 1,3-propanediol, dipropylene glycol, tripropylene glycol, glycerin, trimethylolpropane, trimethylolethane, neopentyl glycol, 1,6-hexanediol, 1,4-cyclohexanedimethanol, 1,2,6-hexanetriol, triethanolamine, pentaerythritol, erythritol, sorbitol, sucrose, mannitol, N,N,N',N'-tetrakis(2-hydroxypropyl)-ethylenediamine, and the like, and polyester and/or polyester polyols having hydroxyl numbers from 20 to 199. Examples of iii) include monoethanolamine, diethanolamine, ethylene diamine, diethylene triamine, other polyalkylene polyamines, diethyl toluenediamine, dimethylthiotoluenediamine, aminated polyethers having molecular weights of 200 to 6,000 and the like.

Component h), if present at all, preferably constitutes up to 20%, up to 10%, up to 8% or up to 4% of the combined weight of components a)-f) and h). Water is a preferred optional ingredient and when present preferably constitutes 0.5 to 3.5, especially 1.5 to 3.5%, of the combined weight of components a-f) and h).

In addition to the foregoing components, the formulated polyol composition or reaction mixture may contain one or more fillers and/or reinforcing agents such as fiber glass, carbon fibers, flaked glass, mica, talc, melamine and calcium carbonate; one or more pigments and/or colorants such as titanium dioxide, iron oxide, chromium oxide, azo/diazo dyes, phthalocyanines, dioxazines and carbon black; one or more biocides; one or more preservatives; one or more antioxidants; one or more flame retardants; and the like.

The formulated polyol composition of the invention can be made by simple mixing of components a)-f), plus any optional ingredients as may be desirable. The HFO or HCFO blowing agent should be combined with the other ingredients at a temperature below its boiling temperature and/or at an elevated pressure to avoid volatilization.

Foam is made in accordance with the invention by combining ingredients a)-f) (and h) if present) as described above with g) at least one organic polyisocyanate to produce a reaction mixture which is then cured under conditions such that component d) volatilizes and components a), b), g) and h) (if present) react to produce the polymeric foam. The isocyanate index (100 times the ratio of isocyanate groups to isocyanate-reactive groups provided to the reaction mixture) is at least 90, preferably at least 100 or at least 110. When a polyurethane-isocyanurate foam is desired, the isocyanate index preferably is at least 200, at least 250 or at least 300. In some embodiments, the isocyanate index may be up to 1000, up to 600, up to 500 or up to 450.

Components a) and/or b) may be formed together with any one or more of components c)-f) and h) into a formulated polyol composition as described above, prior to being combined with the organic polyisocyanate to produce the foam. In preferred embodiments, a formulated polyol composition comprising at least components a)-f) (and optionally component h)) is first prepared, and the reaction mixture is formed by combining the previously-formed polyol composition with the polyisocyanate. It is within the scope of the invention, however, to produce the reaction mixture by bringing the various components together all at once, or in various subcombinations.

Suitable organic polyisocyanates include aliphatic, cycloaliphatic, araliphatic or aromatic polyisocyanates, or combinations of any two or more thereof. Such may include, for example, alkylene diisocyanates, particularly those having from 4 to 12 carbon atoms in the alkylene moiety, such as 1,12-dodecane diisocyanate, 2-ethyltetramethylene 1,4-diisocyanate, 2-methyl-pentamethylene 1,5-diisocyanate, 2-ethyl-2-butylpentamethylene 1,5-diisocyanate, tetramethylene 1,4-diisocyanate and preferably hexamethylene 1,6-diisocyanate; cycloaliphatic diisocyanates such as cyclohexane 1,3- and 1,4-diisocyanate and any mixture of these isomers, 1-isocyanato-3,3,5-trimethyl-5-isocyanato-methyl-cyclohexane (isophorone diisocyanate), 2,4- and 2,6-hexahydrotoluene diisocyanate and the corresponding isomer mixtures, 4,4'-, 2,2'- and 2,4'-dicyclohexylmethane diisocyanate and the corresponding isomer mixtures, araliphatic diisocyanates such as 1,4-xylylene diisocyanate and xylylene diisocyanate isomer mixtures, and preferably aromatic diisocyanates and polyisocyanates, such as 2,4- and 2,6-toluene diisocyanate and the corresponding isomer mixtures, 4,4'-, 2,4'- and 2,2'-diphenylmethane diisocyanate and the corresponding isomer mixtures, mixtures of 4,4'- and 2,4'-diphenylmethane diisocyanates, polyphenyl-polymethylene polyisocyanates, mixtures of 4,4'-, 2,4'- and 2,2'-diphenylmethane diisocyanates and polyphenylpolymethylene polyisocyanates (crude MDI), and mixtures of crude MDI and toluene diisocyanates. The organic polyisocyanates may be employed individually or in the form of combinations of any two or more thereof.

Modified polyisocyanates, i.e., products which are obtained by chemical reaction of organic diisocyanates and/or polyisocyanates, may also be used. Specific examples are ester-, urea-, biuret-, allophanate-, uretoneimine-, carbodiimide-, isocyanurate-, uretdione- and/or urethane-containing diisocyanates and/or polyisocyanates, that contain from 33.6 to 15 percent by weight, preferably from 31 to 21 percent by weight, of isocyanate groups, based on the total weight of the modified polyisocyanate.

Reaction conditions are selected such that the blowing agent volatilizes and components a), b) and g) (and h) if present) react to produce the rigid polyurethane foam. The conditions typically include a temperature above the boiling temperature of the HFO and/or HCFO blowing agent at the pressure employed. Components a), b) and g) (and h) if present) typically will react spontaneously when mixed, even at room temperature, and the exothermic heat of reaction is often sufficient to produce the temperature needed to volatilize the hydrocarbon blowing agent. Therefore, it is often necessary only to form the reaction mixture at or about room temperature, such as 10 to 35° C., and allow the reaction to complete without further applied heat. However, if desired, the components can be heated at the time of or prior to forming the reaction mixture, and/or the reaction mixture can be heated to an elevated temperature to promote the curing reaction.

In some embodiments the foam is produced by introducing the reaction mixture into a cavity or defined space where the expansion and curing takes place. The cavity or defined space may be, for example, a thermal insulation panel or wall, such as a wall of a refrigerator, freezer or cooler. The cavity may be a space between facing layers, as in producing sandwich panels for the construction or transportation industries. In such embodiments, the expansion of the reaction mixture is constrained by the geometry of the cavity, the cured foam taking the shape defined by the interior surfaces of the cavity.

In other embodiments, the foam is produced in a continuous process by continuously dispensing the reaction mixture onto a moving belt or substrate. The substrate may be a facing sheet or panel, and a second layer of a facing sheet or panel may be continuously laid on top of the reaction mixture to form a sandwich structure. The reaction mixture is cured to form a foam adherent to the substrate(s).

Alternatively, the foam can be produced in a free-rise process in which the foam formulation is dispensed into an open area and permitted to rise freely in the vertical direction to produce bunstock.

Foam made in accordance with the invention may have a foam density of, for example, 20 to 120 kg/m$^3$ or 30 to 80 kg/m$^3$ as measured according to ASTM 1622-88. The cells may be at least about 70 percent closed, at least about 80 percent closed or at least about 85 percent closed.

An advantage of the invention is that the foam exhibits useful flame retardant properties, even after a formulated polyol composition of the invention is prepared and aged for a considerable period prior to making the foam In some embodiments, the flame height when the foam is burned in accordance with DIN 4102 is no greater than 100 mm, even when the foam is prepared from a formulated polyol composition of the invention that has been aged at 40° C. for 28 days before producing the foam.

The following examples are provided to illustrate the invention but not to limit the scope thereof. All parts and percentages are by weight unless otherwise indicated.

EXAMPLES 1-4 AND COMPARATIVE SAMPLES A-B

Formulated polyol compositions are made by combining the ingredients listed in Table 1.

Polyol A is a polyether polyol having a hydroxyl functionality of 4.5 and a hydroxyl number of 490.

Polyol B is a terephthalic acid/diethylene glycol/ethylene glycol/glycerin polyester polyol having an average hydroxyl functionality of 2.4 and a hydroxyl number of 315.

Halogenated Polyol is a polyester diol based on tetrabromophthalic acid having a hydroxyl number of 220.

LBA is Solstice® LBA, trans-1-chloro-3,3,3-trifluoropropene.

Catalyst A is a mixture of 70% 1,2-dimethylimidazole and 30% ethylene glycol.

Catalyst B is 2,2-dimorpholinoether (DMDEE).

Catalyst C is a mixture of tetraethyl guanidine and 2,2,2-dimethylaminoethoxyethyl methylaminoethanol.

Catalyst D is dimethylcyclohexylamine.

Catalyst E is a mixture of 70% bis(N,N-dimethylaminoethy)ether and 30% dipropylene glycol.

Catalyst F is dimethylbenzyl amine.

TABLE 1

| Ingredient | Parts By Weight | | | | | |
|---|---|---|---|---|---|---|
| | Comp. A* | Comp. B* | Ex. 1 | Ex. 2 | Ex. 3 | Ex. 4 |
| Polyol A | 25.17 | 25.17 | 26.63 | 26.63 | 26.63 | 26.63 |
| Polyol B | 34.52 | 34.52 | 34.52 | 34.52 | 34.52 | 34.52 |
| Halogenated Polyol | 10.7 | 10.7 | 10.7 | 10.7 | 10.7 | 10.7 |
| Triethyl Phosphate | 5.0 | 5.0 | 5.0 | 5.0 | 5.0 | 5.0 |
| Trichloropropyl Phosphate | 10.0 | 10.5 | 10.0 | 10.0 | 10.0 | 10.0 |
| HFC 245a | 3.0 | 0 | 0 | 0 | 0 | 0 |
| HFC 365/227 (93:7) | 5.0 | 0 | 0 | 0 | 0 | 0 |
| LBA | 0 | 7.5 | 7.0 | 7.0 | 7.0 | 7.0 |
| Water | 2.8 | 2.8 | 2.8 | 2.8 | 2.8 | 2.8 |
| Silicone Surfactant | 2.96 | 2.96 | 2.5 | 2.5 | 2.5 | 2.5 |
| Catalyst A | 0 | 0 | 0.6 | 0.6 | 0.35 | 0.15 |
| Catalyst B | 0 | 0 | 0 | 0.25 | 0.45 | 0.4 |
| Catalyst C | 0 | 0 | 0.25 | 0 | 0 | 0 |
| Catalyst D | 0 | 0 | 0 | 0 | 0 | 0.15 |
| Catalyst E | 0.25 | 0.25 | 0 | 0 | 0 | 0 |
| Catalyst F | 0.6 | 0.6 | 0 | 0 | 0 | 0 |

Each of the formulated polyol compositions is evaluated twice by reacting it with a polyisocyanate to produce a foam, once immediately upon being prepared and once after a portion of the composition is stored at 40° C. for 28 days. The polyisocyanate is a polymeric MDI having an average isocyanate functionality of 2.7 and an isocyanate content of 31.1%. The weight ratio of the polyisocyanate to the formulated polyol composition is 1.23 in all cases.

The foam is made by separately bringing the polyisocyanate and formulated polyol composition to 20-22° C. and then mixing them using a high speed laboratory mixer to form a homogeneous reaction mixture. The reaction mixture is poured into a 20 cm×20 cm box and allowed to rise freely and cure. The foam is cut into test specimens after one hour.

Gel time is evaluated by touching the surface of the curing reaction mixture periodically with a metal stick. The gel time is the time after the polyisocyanate and formulated polyol composition are mixed at which strings no longer form when the metal stick is pulled away. Free rise foam density is measured according to ASTM D 6226. Open cell content is measured according to ASTM D 1622. The foams are evaluated according to DIN 4102 and the flame height measured. In addition, the friability of the foams made after aging the formulated polyol compositions for 28 days is evaluated subjectively. Results are as indicated in Table 2.

TABLE 2

| | Comp. A* | Comp. B* | Ex. 1 | Ex. 2 | Ex. 3 | Ex. 4 |
|---|---|---|---|---|---|---|
| 0 days aging results | | | | | | |
| Gel time, s | 149 | 155 | 100 | 132 | 155 | 135 |
| Foam Density, kg/m$^3$ | 33.2 | 33.4 | 32.1 | 32.8 | 30.5 | 29.2 |
| Open Cell Content, % | 14 | N.D. | N.D. | N.D. | 11 | 13 |
| Flame height, mm | 125 | 115 | 85 | 85 | 80 | 75 |
| 28 days aging results | | | | | | |
| Gel time, s | 160 | 200 | 102 | 170 | 159 | 143 |
| % increase[1] | 7% | 29% | 2% | 29% | 2.5% | 6% |
| Foam Density, kg/m$^3$ | 34.0 | 33.9 | 32.9 | 33.2 | 30.9 | 29.9 |
| Open Cell Content, % | N.D. | N.D. | N.D. | N.D. | 12 | 14 |
| Flame height, mm | 130 | 150 | 95 | 95 | 85 | 85 |

*Not an example of the invention.
[1] % increase in gel time after aging the formulated polyol composition for 28 days prior to foaming.

Comparative Sample A is a baseline case in which the blowing agent is a mixture of HFC 245a, HFC 365 and HFC 227 and a conventional amine catalyst package is used. The gel time prior to aging the formulated polyol composition is 149 seconds; this increases 7% when the polyol composition is aged before foaming. The foam is brittle. The flame height on the DIN 4102 test is 125 mm on foams made prior to aging the formulated polyol composition; this rises slightly to 130 mm on foams made after the aging step.

Comparative Sample B shows the effect of substituting an HFCO blowing agent into the formulation of Comparative Sample A. Pre-aging values for gel time, free rise density, open cell count and flame height are quite similar to those of Comparative Sample A. However, foams made after the formulated polyol compositions are aged demonstrate large increases in gel time. These gel time increases are clear indications of storage instability. In addition, the foams become very brittle. Comparative Sample B exhibits a large increase in flame height when the polyol has been aged prior to foaming.

Examples 1-4 show the effect of the selection of various catalyst mixtures that all include a dialkylimidazole catalyst.

Foam made from formulated polyol composition Example 1 shows almost no change in gel time when made after the polyol composition has been aged for 28 days. This indicates exceptionally good storage stability. Aging the polyol composition does not alter any other foam properties in any significant way.

A 29% increase in gel time is seen in foams made after the formulated polyol composition of Example 2 has been aged 28 days. However, no foam brittleness is seen.

Examples 1 and 2 are somewhat more reactive than Comparative Samples A and B. In Example 3, the amounts of catalysts are adjusted to bring the gel time of the unaged case into line with Comparative Samples A and B. Only a 2.5% difference in gel time is seen between the unaged and aged cases, the open cell count remains low and only slight brittleness is seen.

Example 4 is similar to Examples 1 and 3 in that aging the polyol composition leads to only a small increase in gel time, and density and open cell count are virtually unaffected.

The performance of the foams of the DIN 4102 flame test is significant and unexpected. Comparative Samples A and B exhibit flame heights that range from 115 to 125 mm for forms made from unaged polyol compositions, and from 130 to 150 mm on foams made from the aged polyol compositions. Foams made from unaged polyol composition Examples 1-4 all exhibit flame heights of only 75 to 85 mm. This is a reduction of approximately 25 to 40%. Only small increases in flame height are seen in the foams made from the aged polyol compositions. Compared to Comparative Samples A and B, Examples 1-4 when made with the aged polyol compositions show reductions in flame height of about 20 to 60%.

The invention claimed is:

1. A formulated polyol composition comprising:
   a) at least one non-halogenated polyol having a hydroxyl functionality of 2 to 8 and a hydroxyl number of 200 to 500;
   b) at least one brominated polyol;
   c) at least one phosphorus-containing flame retardant;
   d) at least one HFO and/or HCFO blowing agent;
   e) at least one foam-stabilizing surfactant and
   f) a urethane catalyst consisting of a dialkylimidazole compound and or or more of 2,2'-dimorpholinodiethylether and N,N-dimethylcyclohexylamine.

2. The formulated polyol composition of claim 1 wherein the brominated polyol has a hydroxyl number of 50 to 400, contains 2 to 8 hydroxyl groups and contains 1 to 4 bromine atoms.

3. The formulated polyol composition of claim 1 wherein the HCFO and/or HCFO is one or more selected from the group consisting of trifluoropropene, 1,3,3,3-tetrafluoropropene, 1,1,3,3-tetrafluoropropene, 2,2,3,3-tetrafluoropropene, 1,2,3,3,3-pentafluoropropene, 1,1,1-trifluoropropene, 1,1,1,3,3-pentafluoropropene, 1,1,2,3,3-pentafluoropropene, (Z)-1,1,1,2,3-pentafluoropropene, 1-chloro-3,3,3-trifluoropropene and 1,1,1,4,4,4-hexafluorobut-2-ene.

4. The formulated polyol composition of claim 1 which further contains h) at least one non-halogenated isocyanate-reactive material different from components a)-f), wherein component a) constitutes 40 to 75% of the combined weights of components a)-f) and h), component b) constitutes 4 to 15% of the combined weights of components a)-f) and h), component c) constitutes 5 to 25% of the combined weights of components a)-f) and h) and component d) constitutes 5 to 30% of the combined weights of components a)-f) and h).

* * * * *